United States Patent [19]
Guichard

[11] 3,996,510
[45] Dec. 7, 1976

[54] SHIELDING ARRANGEMENT FOR SENSING THE PROXIMITY OF A METALLIC OBJECT

[75] Inventor: Robert Charles Guichard, Normal, Ill.

[73] Assignee: General Electric Company, New York, N.Y.

[22] Filed: Mar. 12, 1975

[21] Appl. No.: 557,683

[52] U.S. Cl. .................................. 324/41; 324/3; 336/84
[51] Int. Cl.² .................................. G01R 33/12
[58] Field of Search ............... 324/34 R, 40, 41, 3; 336/84 C, 84 M; 331/65

[56] References Cited
UNITED STATES PATENTS

| | | | |
|---|---|---|---|
| 684,065 | 9/1949 | Grossick | 324/41 |
| 2,550,736 | 5/1951 | Tricebock | 324/41 |
| 2,810,880 | 10/1957 | Buccicone | 324/41 |
| 2,945,216 | 7/1960 | Gyger et al. | 336/84 C |
| 2,958,037 | 10/1960 | Riede et al. | 324/41 |
| 3,328,680 | 6/1967 | Singer | 324/34 R |
| 3,362,002 | 1/1968 | Sedlak et al. | 324/34 R |
| 3,371,272 | 2/1968 | Stanton | 324/34 R |
| 3,473,110 | 10/1969 | Hardin et al. | 324/40 |

Primary Examiner—Robert J. Corcoran
Attorney, Agent, or Firm—Stephen A. Young; Walter C. Bernkopf; Robert A. Cahill

[57] ABSTRACT

A metal proximity sensor comprised of a housing having a sensing surface and a mounting surface opposite the sensing surface. The sensor is further comprised of a coil positioned within a cavity of a ferromagnetic pot core, wherein both components are positioned within the housing and adjacent the sensing surface. A ferromagnetic shield is provided for shielding the magnetic field, generated by the coil, from electromagnetic energy generated externally of the mounting surface of the housing. A second shield is comprised of a metal layer having a resistivity of less than $3\mu$ ohm-centimeters for preventing the electromagnetic field, generated by the coil, from penetrating out of the sensor and through the mounting surface. The second shield is disposed between the first shield and the core. Finally, circuit means is provided for actuating an external load when a metal being detected passes near the sensing surface and through the magnetic field generated by the coil.

9 Claims, 5 Drawing Figures

U.S. Patent  Dec. 7, 1976  3,996,510
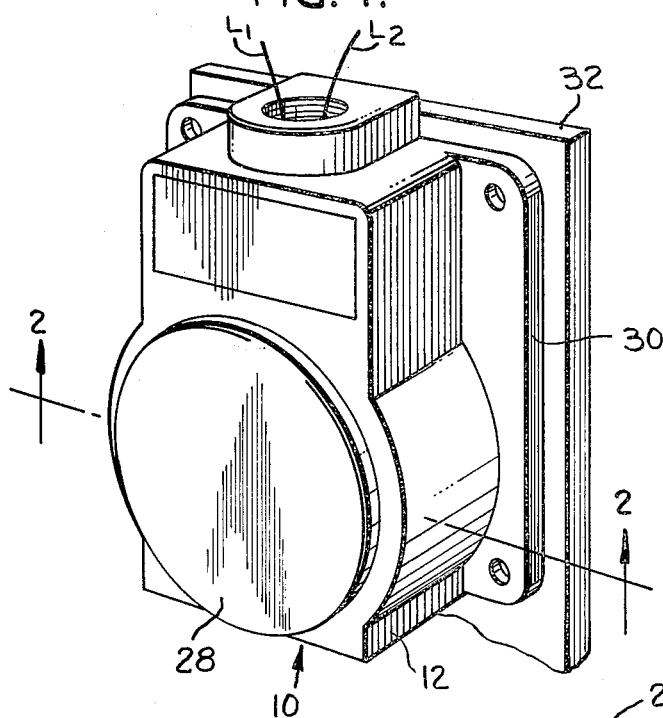
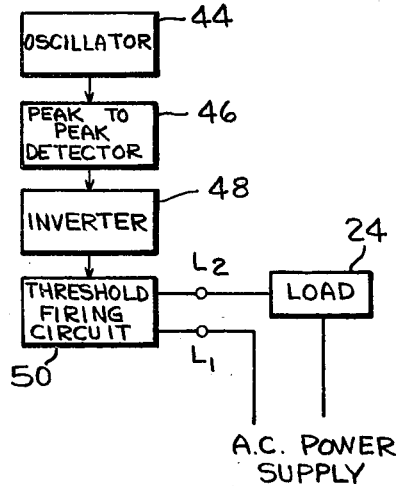
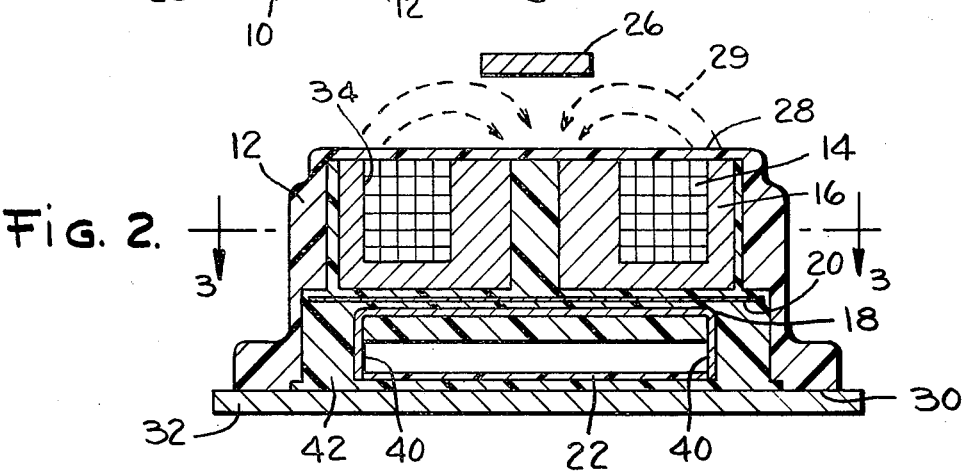
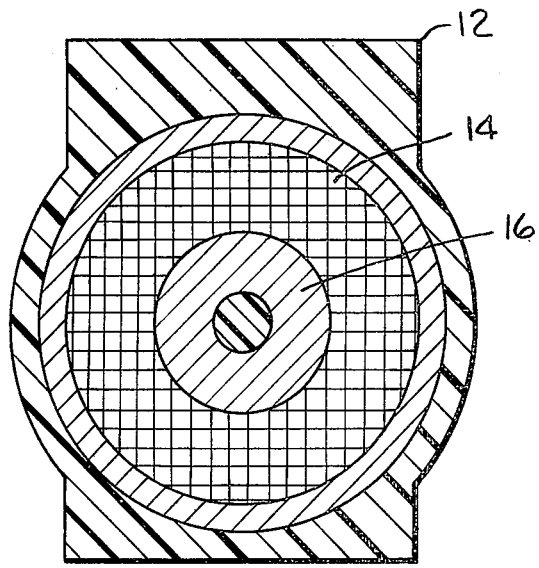
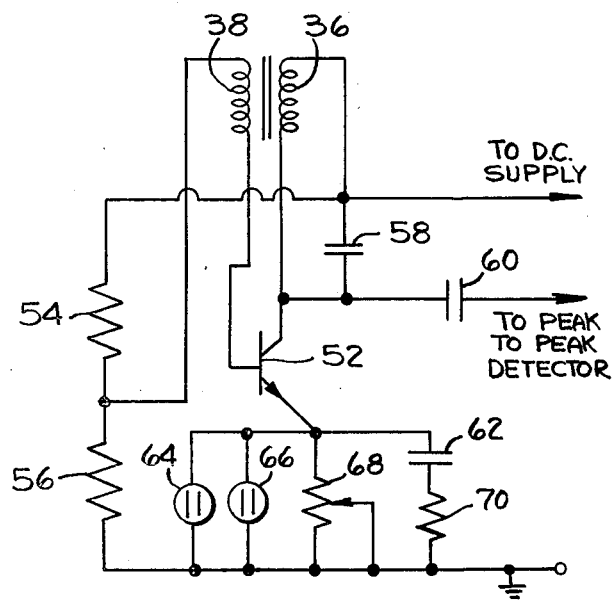

SHIELDING ARRANGEMENT FOR SENSING THE PROXIMITY OF A METALLIC OBJECT

BACKGROUND OF THE INVENTION

1. Field of the Invention

This invention is related to proximity detectors, and, more particularly, to metal proximity sensors.

2. Description of the Prior Art

A metal proximity sensor, of the type which relies upon the magnetic field generated by a sensing coil to detect the presence or passage of a metal object through the magnetic field is usually mounted on a metal plate or other similar type of support. The composition of the metal support, its bulk and its resistivity can vary. Inasmuch as the magnetic field generated by the sensing coil can penetrate into the sensor's support, the applicant has discovered that the physical and electrical characteristics of the support can actually affect the operation and sensitivity of the sensor. Thus, for a metal proximity sensor having specific design and operating characteristics, exposure to various mounting plates or support structures can limit or interfere with the proper operation of the sensor. In fact, there may be times when the mounting plate may prevent proper operation of the sensor, since the mounting plate could absorb sufficient energy from the magnetic field to cause a continuous readout by the sensor which would erroneously indicate the presence of a metal object within close proximity of the sensing surface of the sensor.

OBJECTS OF THE INVENTION

It is therefore an object of this invention to provide an improved metal proximity sensor which can be reliably affixed to any mounting surface without effecting the performance, operation, and, more specifically, the sensitivity of the sensor.

It is another object of this invention to provide an improved metal proximity sensor, which limits the flow of magnetic flux generated by its sensing coil to an area adjacent its sensing surface, and at the same time blocks penetration of the generated magnetic flux through its mounting surface and into a mounting plate or support.

Other objects of the invention will be pointed out hereinafter.

SUMMARY OF THE INVENTION

In accordance with a broad aspect of this invention there is provided a metal proximity sensor comprised of a housing having a sensing surface and a mounting surface opposite the sensing surface. The sensor is further comprised of a ferromagnetic core having a cavity therein, and a coil positioned within the cavity, wherein the core and coil are positioned adjacent the sensing surface of the housing. Further included is a first shield which is comprised of ferromagnetic material for shielding the magnetic field generated by the coil from electromagnetic energy which is generated externally of the mounting surface of the housing. A second shield is also provided and is comprised of a metal layer having a resistivity of less than $3\mu$ohm-centimeters for preventing the electromagnetic field generated by the coil from penetrating out of the mounting surface of the sensor. The second shield is disposed between the first shield and the core. Circuit means, electrically coupled to the coil and disposed between the first shield and the mounting surface, for actuating an external load when a metal being detected passes near the sensing surface and through the magnetic field generated by the coil, is also provided.

According to one feature of the invention the second shield is comprised of a sheet of foil whose outer periphery extends beyond the outer periphery of the ferromagnetic core. This sheet of foil can be comprised of any commercially available metal foil selected from a group consisting of aluminum, copper, gold or silver. The metal foil can be physically separated from adjacent surfaces of the ferromagnetic core and the first shield by a suitable dielectric material.

BRIEF DESCRIPTION OF THE DRAWING

FIG. 1 is a perspective view of the metal proximity sensor positioned to be attached to a mounting plate or support;

FIG. 2 is a cross sectional view of the sensor shown in FIG. 1 taken along lines 2—2;

FIG. 3 is a cross sectional view of the sensor shown in FIG. 2 taken along lines 3—3;

FIG. 4 is a circuit block diagram of the metal proximity sensor; and

FIG. 5 is a circuit diagram of the oscillator circuit shown in FIG. 4 showing the windings of the coil, shown in FIGS. 2 and 3, being electrically connected to and part of the oscillator circuit.

DESCRIPTION OF THE PREFERRED EMBODIMENT

The invention will now be explained with reference to FIGS. 1 through 5. Referring more particularly to FIGS. 1 through 3, a metal proximity sensor 10 is comprised of a plastic molded housing 12, which encloses a sensing coil 14, a ferromagnetic pot core 16, a first shield 18 comprised of ferromagnetic material, a second shield 20 disposed between first shield 18 and pot core 16, and a printed circuit board 22 containing thereon circuit means which is electrically coupled to coil 14 for actuating an external load 24, shown in FIG. 4, when a metal object 26, shown in FIG. 2, being detected passes near a sensing surface 28 of housing 12 and through a magnetic field 29 generated by coil 14.

Housing 12 also has a mounting surface 30 which abuts a mounting plate or support 32 to which sensor 10 is affixed. Coil 14 is positioned within a cavity 34 of pot core 16 and is adjacent sensing surface 28. The design and configuration of coil 14 and pot core 16 is such that a magnetic flux emanating from the coil upon energization thereof tends to be concentrated externally of and adjacent sensing surface 28 of housing 12. More particularly, coil 14 is comprised of first and second windings 36 and 38 shown in FIG. 5. These windings are positioned for optimum mutual coupling and 180° phase shift. Further description of the circuit relationship of windings 36 and 38 will be provided later.

First shield 18 contains at least 3 side flaps 40 (only two being shown in FIG. 2) which tends to increase the performance of the shield by preventing radiation originating within the circuit means on board 22, and externally of the mounting surface of the sensor housing, from penetrating through shield 18 and adversely affecting the magnetic field generated by coil 14.

Second shield 20 can be comprised of a sheet of commercially available foil having a typical thickness, by way of example only, of 3 to 5 mils. Shield 20 can be disposed between shield 18 and pot core 16 and separated therefrom by a suitable dielectric material. The resistivity of shield 20 should be less than 3 $\mu$ ohm-centimeters, and the material can be comprised of aluminum, copper, gold, silver or any other suitable metal or alloy having the required resistivity. For further optimization of performance, the outer periphery of shield 20 should extend beyond the outer periphery of pot core 16.

It has been discovered by the applicant that shield 20, as defined and described above, will prevent the magnetic field generated by coil 14 from penetrating shield 20, since the shield will act as a shorted turn for absorbing electromagnetic energy when the coil is part of an oscillator circuit which is generating a signal having a frequency ranging, in this example, between 40 KHz and 80 KHz. Below a frequency of 40 KHz shield 20 becomes less effective due to a reduction in the flow of induced eddy currents therein, and, in this example, above 80 KHz the electromagnetic characteristics of the pot core material have a tendency to degenerate. Thus, shield 20, as pointed out above, tends to effectively concentrate the magnetic lines of flux generated by coil 14 in an area immediately adjacent sensing surface 28, and prevents the magnetic lines of flux from extending therethrough and into mounting plate 32. Even though mounting plate 32 can be comprised of steel or any other type of material, depending upon the whim of the purchaser of the sensor, the mounting plate no longer is a factor in the operation of the sensor, and the sensor can be expected to perform satisfactorily regardless of the type of mounting plate selected and used. At this point it should be noted that a potted material 42, which can be comprised of silicone rubber, is used to close off the rear of housing 12 adjacent mounting surface 30, surround circuit board 22, and provide a dielectric material disposed on both sides of shield 20 and between core 16 and shield 18.

As shown in FIG. 4, the circuit means mounted on circuit board 22 is essentially comprised of an oscillator 44, a peak-to-peak detector 46, an inverter 48, and a threshold firing circuit 50. The output of the threshold firing circuit is also the electrical output of the sensor as shown by terminal markings L1 and L2 in FIGS. 1 and 4. L1 is electrically connected to one side of an AC power supply, and L2 is electrically coupled to the other side of the AC power supply via load 24, as shown in FIG. 4.

Oscillator 44, which may have a typical oscillating frequency of 50 KHz, is a standard tuned collector LC oscillator circuit, as shown in FIG. 5. Windings 36 and 38, which comprise coil 14, are electrically coupled to and are part of oscillator 44 as will now be explained. Oscillator 44 is further comprised of a transistor 52, biasing resistors 54 and 56, a tuning capacitor 58, an output coupling capacitor 60, a bypass capacitor 62, thermistors 64 and 66, a variable emitter load resistor 68 and a temperature stabilizing resistor 70. The collector of transistor 52 is electrically connected to one terminal of winding 36 and one terminal of tuning capacitor 58, while the other terminal of winding 36 and capacitor 58 are electrically connected to a source of DC supply. The collector of transistor 52 is also electrically connected to peak-to-peak detector 46 via coupling capacitor 60. The base of transistor 52 is electrically coupled to one terminal of respective biasing resistors 54 and 56 via winding 38. The other terminal of resistor 54 is electrically connected to the source of DC supply, while the other terminal of resistor 56 is electrically connected to circuit ground. The emitter of transistor 52 is electrically connected to one terminal of thermistors 64 and 66, variable resistor 68, and bypass capacitor 62. The other terminals of thermistors 64 and 66 and variable resistor 68 are electrically connected to circuit ground, while the other terminal of bypass capacitor 62 is electrically connected to one terminal of temperature stabilizing resistor 70. The other terminal of temperature stabilizing resistor 70 is also connected to circuit ground. As stated above, winding 36 is mutually coupled to winding 38 to provide 180° phase shift in addition to the 180° phase shift normally provided between the base to collector of transistor 52. This insures that the circuit will oscillate at the frequency determined by empirical formulas and by the selection of the values of the circuit components and characteristics of the pot core material and shield 20.

The peak-to-peak detector, in this instance, can be a standard negative type peak-to-peak detector described in textbooks, while inverter 48 can be comprised of a suitable amplifier stage or stages which will not load down either the peak-to-peak detector or the oscillator circuit. The threshold firing circuit can be comprised of a simple SCR which has its gate electrode connected to the inverter output and its anode and cathode electrically connected to respective terminals L1 and L2, such that upon the application of a suitable potential to the gate electrode of the SCR from the output of the inverter, the SCR fires and allows current to flow from the AC power supply through load 24 and the anode to cathode of the SCR. It should be noted that, alternatively, the threshold firing circuit may also be comprised of other types of threshold firing circuits, such as Schmidt trigger circuit which will fire a power transistor whose emitter and collector are in series with load 24.

The operation of sensor 10 will now be explained. Normally when no metal object is close enough to the sensitive range of sensing surface 28, oscillator 44 oscillates at its desired output frequency, and a signal is applied to the input of peak-to-peak detector 46. The rectified output of peak-to-peak detector 46 is applied to inverter 48, which, in turn, applies a zero signal to the gate electrode of the threshold firing circuit 50. This, in turn, insures that the threshold firing circuit will be off, and no current will flow through load 24 from the AC power supply. As soon as metal object 26 passes within the sensitivity range of sensing surface 28, sufficient electromagnetic energy from the magnetic field generated by coil 14 will be absorbed by the metal object to cause termination of the oscillating signal applied to the input of the peak-to-peak detector. This, in turn, results in a zero output level of the peak-to-peak detector being applied to inverter 48, which, in turn, results in a voltage level of sufficient magnitude being applied to threshold firing circuit 50 to cause the threshold firing circuit to trigger and allow current to flow from the AC power supply through load 24.

Thus, due to the presence of the sheet of foil, which comprises shield 20, the sensor functions predictably and independently of the physical, electrical and magnetic characteristics of the mounting plate which is used to support sensor 10.

Although the invention has been described with reference to a specific embodiment thereof, numerous modifications are possible without departing from the invention, and it is desirable to cover all modifications falling within the spirit and scope of this invention.

What I claim as new and desire to secure by Letters Patent of the United States is:

1. A shielding arrangement for a metal proximity sensor operating at frequencies above 40 $KH_z$, said sensor including a housing having a sensing surface and a mounting surface opposite said sensing surface, a coil positioned within said housing and adjacent said sensing surface for generating a magnetic field, a ferromagnetic core having a cavity therein for receiving and supporting said coil, and circuit means electrically coupled to said coil for actuating an external load when a metal being detected passes near said sensing surface and through the magnetic field generated by said coil, said shielding arrangement comprising:
   a. a first shield comprised of ferromagnetic material for shielding the magnetic field generated by said coil from magnetic and electromagnetic energy generated externally of said mounting surface of said housing, said circuit means being disposed between said first shield and said mounting surface; and
   b. a second shield comprised of a metal layer having a resistivity of less than $3\mu$ohm centimeters for preventing the electromagnetic field generated at frequencies at least equal to and greater than 40 $KH_z$ by said coil from penetrating out of said sensor through said mounting surface, said second shield being disposed between said first shield and said core, whereby said second shield is closer to said coil and said core than is said first shield.

2. A metal proximity sensor according to claim 1, wherein said second shield is in the form of a sheet of foil.

3. A shielding arrangement for a metal proximity sensor according to claim 1, wherein said second shield is comprised of a metal selected from a group consisting of aluminum, copper, silver and gold.

4. A shielding arrangement for a metal proximity sensor according to claim 2, wherein the outer periphery of said sheet of foil extends beyond the outer periphery of said core.

5. A shielding arrangement for a metal proximity sensor acccording to claim 2, wherein said sheet of foil is spaced apart from an adjacent surface of said first shield.

6. A shielding arrangement for a metal proximity sensor according to claim 5, further comprising a dielectric material positioned between said first and second shields.

7. A shielding arrangement for a metal proximity sensor according to claim 6, wherein said dielectric material is comprised of silicone rubber.

8. A shielding arrangement for a metal proximity sensor according to claim 7, wherein said sheet of foil is spaced apart from an adjacent surface of said core.

9. A shielding arrangement for a metal proximity sensor according to claim 8, further comprising silicone rubber disposed between said sheet of foil and said core.

* * * * *

UNITED STATES PATENT OFFICE
CERTIFICATE OF CORRECTION

PATENT NO. : 3,996,510
DATED : December 7, 1976
INVENTOR(S) : ROBERT CHARLES GUICHARD It is certified that error appears in the above—identified patent and that said Letters Patent are hereby corrected as shown below:

Claim 2, line 1, before "A metal proximity sensor" insert therein --A shielding arrangement for--.

Signed and Sealed this

Fifteenth Day of February 1977

[SEAL]

Attest:

RUTH C. MASON
Attesting Officer

C. MARSHALL DANN
Commissioner of Patents and Trademarks